Dec. 27, 1949  A. BECHLER  2,492,455
AUTOMATIC LATHE
Filed Sept. 20, 1946
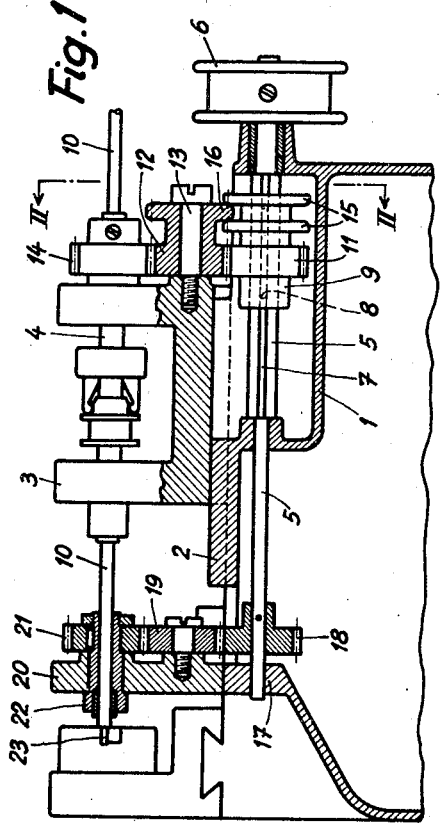
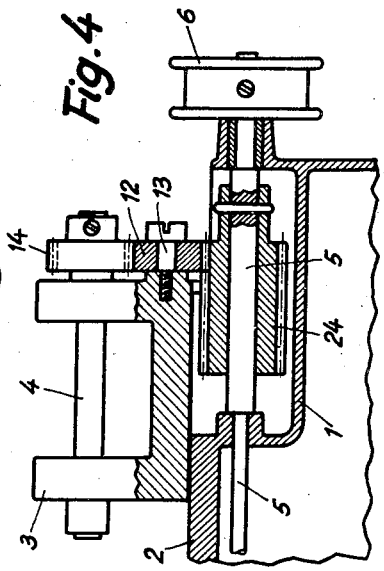
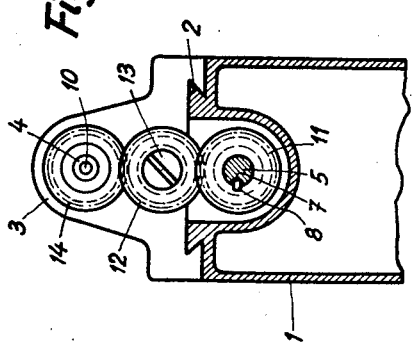
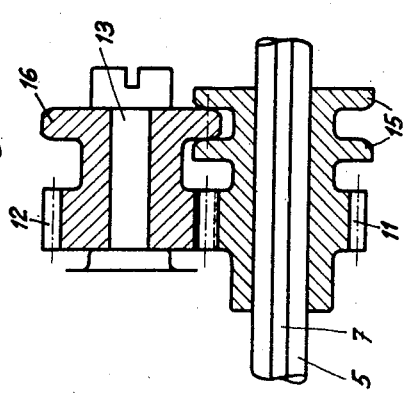
INVENTOR
ANDRÉ BECHLER
By Young, Emery & Thompson ATTYS Patented Dec. 27, 1949

2,492,455

UNITED STATES PATENT OFFICE 2,492,455

AUTOMATIC LATHE

André Bechler, Moutier, Switzerland

Application September 20, 1946, Serial No. 698,194
In Switzerland May 3, 1946

4 Claims. (Cl. 82—28)

There exist automatic lathes with movable headstock moving in a plane parallel to the live spindle axis, the chuck of which is driven by a gear-wheel. The positive transmission between the driver and the chuck is constituted by laterally arranged gears, that is not only cumbersome but limits the number of uses of the lathe in question.

In the automatic lathe according to the present invention, an idle gear wheel situated beneath the headstock transmits the rotary motion of the driver to the chuck. The headstock can be displaced longitudinally, taking with it a sliding gear consisting of a pinion engaging with the idle wheel. The sliding gear is drawn along by means of discs cooperating in rolling contact along a line coinciding with the pitch circles of the respective wheels.

The attached drawing represents, by way of example, two embodiments of the screw cutting lathe according to the invention.

Fig. 1 is a side-elevation of the lathe, seen partly in section.

Fig. 2 is an end view of the same, seen in section along the line II—II in Fig. 1.

Fig. 3 is a view of a part of the lathe shown in Fig. 1.

Fig. 4 is a side-elevation, seen partly in section, of a second embodiment of the invention.

With reference to Figs. 1, 2 and 3, the frame or bed of the lathe is denoted by 1; along the upper surface of the bed a headstock 3 is capable of moving in a plane parallel to the live spindle. The motion of the headstock is directed by a cam wheel not represented of construction familiar to specialists.

Lying in a perpendicular plane passing through the chuck, a shaft 5 is carried in bearings in the bed of the lathe and is driven by a pulley 6. This shaft is provided with a longitudinal slot 7 in a certain portion of its length, along which a cotter 8, planted in the hub of the sliding gear, can move, to form a sliding coupling. The sliding gear is driven by the pulley 6 and thus imparts rotary motion to the chuck 4, for the turning of the bar 10 from which the pieces are formed. The motion is transmitted to the live spindle through the medium of a pinion 11 in mesh with an intermediary pinion 12, constituting the idlewheel, turning on its axle 13 screwed in the headstock 3. The intermediary pinion 12 drives the helical gear wheel 14, keyed to the live spindle 4. The pinion 11 is solid with two discs 15 of the same diameter, between which a third disc 16 solid with the intermediary pinion 12 turns. These parts 11, 12, 15 and 16 are shown more clearly in Fig. 3 from which it can be seen that the discs 15 come into contact with the third disc 16 along the line coinciding with the pitch circles of the two pinions 11 and 12. In this way there results little or no friction between these revolving parts.

The shaft 5 extends to the front of the lathe and is pivoted in the frame or bed at 17; it carries a pinion 18 close to the bearing in mesh with an idle wheel 19 pivoted to the support 20 for the work guide bushing 22, and engaging with another pinion 21 integral with the cannon through which the bar 10 from which the pieces are formed passes, so that this work guide bushing turns at the same speed as the chuck 4.

When the lathe is running, the tools presented from the sides 23 moves to the work at the free end of the work guide bushing 22. The headstock, whose motion is directed by a cam wheel not represented, moves along the bed of the lathe, taking with it the idle wheel 12 with disc 16 cooperating with the discs 15, in such a manner that the sliding gear 9 is drawn along the shaft 5. Whatever may be the position of the sliding gear, the latter is made to turn in virtue of the coupling formed by the cotter 8 cooperating with the slot 7.

In the embodiment represented in Fig. 4, most of the parts described above are to be found. But in this case the idle wheel 12 is in continuous mesh with a long pinion 24 keyed to the shaft 5 and driven by the pulley 6. Clearly, the motions of the headstock 3 along the bed 2 supported by the frame 1 have no influence on the positive transmission between the shaft 5 and the chuck 4, for the teeth of the idle wheel 12 slip within those of the long pinion 24. In this particular case, it is however impossible to provide the pinions with helical teeth as can be done in the embodiment shown in Figs. 1 and 2.

In both embodiments, the intermediary pinions, serving as idle wheels, could also be replaced by a number of gears or idle wheels.

What I claim is:

1. In an automatic lathe, a base, a rotatable spindle, a headstock carrying said spindle and being mounted on said base slidably in a direction parallel to said spindle, a spindle-drive shaft mounted on said base at a place beneath said headstock, a gear wheel on said spindle, a sliding gear mounted on said spindle-drive shaft displaceably in longitudinal direction of the latter, an idle gear means mounted on said slidable headstock, in engagement with said gear wheel and said sliding gear to rotate said spindle by said spindle-drive shaft, a coupling means fixed to said sliding gear, and a coupling part fixed to said idle gear means and engaging said coupling means to displace said sliding gear longitudinally on a displacement of said headstock.

2. In an automatic lathe, a base, a rotatable spindle, a headstock carrying said spindle and being mounted on said base slidably in a direction parallel to said spindle, a spindle-drive shaft mounted on said base at a place beneath said headstock, a gear wheel on said spindle, a sliding gear mounted on said spindle-drive shaft displaceably in longitudinal direction of the latter, an idle gear wheel mounted on said slidable headstock, in drive connection with said gear wheel and said sliding gear to rotate said spindle by said spindle-drive shaft, two discs fixed coaxially to said sliding gear, another disc entering between said two discs, fixed coaxially to said idle gear wheel and in engagement with the discs of said sliding gear along circles equal in diameter to the pitch circles of said sliding gear and said idle gear wheel, to displace said sliding gear longitudinally on a displacement of said slidable headstock.

3. In an automatic lathe, a base, a rotatable spindle, a headstock carrying said spindle and being mounted on said base slidably in a direction parallel to said spindle, a spindle-drive shaft with its axis vertical beneath and parallel to the axis of said spindle, mounted on said base at a place beneath said headstock and provided with a longitudinal groove, a gear wheel on said spindle, a sliding gear mounted slidably on said spindle-drive shaft and having a coupling pin entering said groove, an idle gear wheel mounted on said slidable headstock, in engagement with said gear wheel and said sliding gear to rotate said spindle by said spindle-drive shaft, two discs fixed coaxially to said sliding gear at a distance from each other, another disc entering between said two discs, fixed coaxially to said idle gear wheel and in engagement with the discs of said sliding gear along circles equal in diameter to the pitch circles of said sliding gear and said idle gear wheel, to displace said sliding gear longitudinally on a displacement of said slidable headstock.

4. In an automatic lathe, a base, a rotatable spindle, a headstock carrying said spindle and being mounted on said base slidably in a direction parallel to said spindle, a support mounted on said base, a rotatable work guide mounted on said support, a spindle-drive shaft mounted on said base at a place beneath said headstock and extending to beneath said support, gear transmission means connecting said spindle-drive shaft with said work-guide to rotate the latter by said spindle-drive shaft, a gear wheel on said spindle, a sliding gear mounted on said spindle-drive shaft displaceably in longitudinal direction of the latter, idle gear means mounted on said slidable headstock, in engagement with said gear wheel and said sliding gear to rotate said spindle by said spindle-drive shaft, a coupling means fixed to said sliding gear and a coupling part fixed to said idle gear means and engaging said coupling means to displace said sliding gear longitudinally on a displacement of said headstock.

ANDRÉ BECHLER.

REFERENCES CITED

The following references are of record in the file of this patent:

UNITED STATES PATENTS

| Number | Name | Date |
|---|---|---|
| 195,085 | Brigham | Sept. 11, 1877 |
| 1,952,966 | Bechler | Mar. 27, 1934 |
| 2,288,578 | Yeomans | June 30, 1942 |
| 2,319,963 | Wilson | May 25, 1943 |
| 2,395,365 | Wilson | Feb. 19, 1946 |